United States Patent
Su et al.

(10) Patent No.: US 10,632,682 B2
(45) Date of Patent: Apr. 28, 2020

(54) THREE-DIMENSIONAL PRINTING APPARATUS AND THREE-DIMENSIONAL PRINTING METHOD

(71) Applicants: XYZprinting, Inc., New Taipei (TW); Kinpo Electronics, Inc., New Taipei (TW)

(72) Inventors: Ching-Hua Su, New Taipei (TW); Ting-Yu Lu, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 15/730,737

(22) Filed: Oct. 12, 2017

(65) Prior Publication Data

US 2019/0039316 A1 Feb. 7, 2019

(30) Foreign Application Priority Data

Aug. 4, 2017 (CN) .......................... 2017 1 0659098

(51) Int. Cl.
*G06F 19/00* (2018.01)
*B29C 64/393* (2017.01)
(Continued)

(52) U.S. Cl.
CPC ............ *B29C 64/393* (2017.08); *B33Y 30/00* (2014.12); *B33Y 50/02* (2014.12); *G06F 3/1206* (2013.01);
(Continued)

(58) Field of Classification Search
CPC ..... B29C 64/393; B29C 64/205; B33Y 30/00; B33Y 50/02; B33Y 40/00; H04N 13/279;
(Continued)

(56) References Cited

U.S. PATENT DOCUMENTS

2012/0221433 A1* 8/2012 Plattsmier .......... G06Q 30/0633
705/26.8
2014/0266646 A1* 9/2014 Urbach .................... G08B 6/00
340/407.1
(Continued)

FOREIGN PATENT DOCUMENTS

| JP | 2016163996 | 9/2016 |
| JP | 2017033316 | 2/2017 |
| WO | 2015057845 | 4/2015 |

OTHER PUBLICATIONS

"Search Report of Europe Counterpart Application", dated Jul. 6, 2018, p. 1-p. 7.

*Primary Examiner* — Zhipeng Wang
(74) *Attorney, Agent, or Firm* — JCIPRNET

(57) ABSTRACT

A 3D printing apparatus including a 3D printing device, a VR display device, and a processing device is provided. The VR display device displays a VR image. The VR display device includes an input device. The input device receives an input signal and the input signal in response to selecting a virtual object in the VR image. The processing device obtains a generic model data corresponding to the virtual object based on the input signal. The processing device executes an edit module to edit a 3D model corresponding to the virtual object based on the generic model data. When the processing device outputs a plurality of layered data corresponding to the 3D model to the 3D printing device, the 3D printing device prints a 3D object corresponding to the 3D model based on the plurality of layered data. Moreover, a 3D printing method is also provided.

14 Claims, 3 Drawing Sheets

(51) Int. Cl.
*B33Y 50/02* (2015.01)
*G06T 19/20* (2011.01)
*G06T 17/00* (2006.01)
*B33Y 30/00* (2015.01)
*H04N 13/279* (2018.01)
*G06F 3/12* (2006.01)
*B29C 64/205* (2017.01)
*B33Y 40/00* (2020.01)

(52) U.S. Cl.
CPC .......... *G06F 3/1253* (2013.01); *G06F 3/1284* (2013.01); *G06T 17/00* (2013.01); *G06T 19/20* (2013.01); *H04N 13/279* (2018.05); *B29C 64/205* (2017.08); *B33Y 40/00* (2014.12); *G06T 2219/2021* (2013.01)

(58) Field of Classification Search
CPC .. G06T 17/00; G06T 19/20; G06T 2219/2021
See application file for complete search history.

(56) References Cited

U.S. PATENT DOCUMENTS

| | | | |
|---|---|---|---|
| 2016/0054726 A1* | 2/2016 | Yoo | G05B 19/4099 700/118 |
| 2016/0093100 A1* | 3/2016 | Ju | G06T 19/20 700/98 |
| 2016/0370971 A1* | 12/2016 | Hackett | G06T 11/001 |
| 2017/0015057 A1* | 1/2017 | Stevens | B29C 64/386 |
| 2017/0113412 A1* | 4/2017 | Adams | G05B 19/4099 |
| 2017/0124762 A1* | 5/2017 | Privault | G06T 19/006 |
| 2017/0132842 A1* | 5/2017 | Morrison | G06T 19/006 |
| 2017/0185261 A1* | 6/2017 | Perez | G06F 3/04815 |
| 2017/0345215 A1* | 11/2017 | Khedkar | G06F 3/012 |
| 2018/0074332 A1* | 3/2018 | Li | G06F 1/163 |
| 2018/0121069 A1* | 5/2018 | DiVerdi | G06F 3/04847 |
| 2019/0347865 A1* | 11/2019 | Hackett | G06F 3/017 |

* cited by examiner

THREE-DIMENSIONAL PRINTING APPARATUS AND THREE-DIMENSIONAL PRINTING METHOD

CROSS-REFERENCE TO RELATED APPLICATION

This application claims the priority benefit of China application serial no. 201710659098.5, filed on Aug. 4, 2017. The entirety of the above-mentioned patent application is hereby incorporated by reference herein and made a part of this specification.

BACKGROUND OF THE INVENTION

Field of the Invention

The invention relates to a three-dimensional (3D) printing technique, and more particularly, to a 3D printing apparatus and a 3D printing method.

Description of Related Art

As a result of advances in computer-aided manufacturing (CAM), 3D printing techniques that can rapidly manufacture an original concept design have been developed by the manufacturing industry. 3D printing is actually a collective term for a series of rapid prototyping (RP) techniques, and the basic principles of the techniques all include laminate manufacturing on a print platform and layering an object into a plurality of layers in order on the print platform in the X-Y plane by scanning via a rapid prototyping machine to stack the layered objects into a 3D object.

In general, a 3D printing apparatus can only perform editing and printing operations by the input of a 3D model data by a user. However, in view of the advancement of current virtual reality (VR) techniques, how to combine the advantage of 3D object observation of VR techniques with a 3D printing apparatus to provide the user with spatial experience when operating the 3D printing apparatus is an important current topic.

SUMMARY OF THE INVENTION

The invention provides a three-dimensional (3D) printing apparatus and a 3D printing method that can generate a 3D model corresponding a virtual object based on the virtual object selected by a user in a virtual reality (VR) image and can directly edit the 3D model corresponding to the virtual object selected in the VR image.

The 3D printing apparatus of the invention includes a VR display device, a processing device, and a 3D printing device. The VR display device is configured to display a VR image and includes an input device. The input device is configured to receive an input signal, and the input signal in response to selecting a virtual object in the VR image. The processing device is coupled to the VR display device. The processing device is configured to obtain a generic model data corresponding to the virtual object based on the input signal and execute an edit module to edit a 3D model corresponding to the virtual object based on the generic model data. The 3D printing device is coupled to the processing device. The 3D printing device is configured to print a 3D object corresponding to the 3D model based on a plurality of layered data when the processing device outputs the plurality of layered data corresponding to the 3D model to the 3D printing device.

In an embodiment of the invention, the 3D printing apparatus further includes a storage device. The storage device is coupled to the processing device. The storage device is configured to store the generic model data. The generic model data belongs to a generic format data, or the generic model data includes a 3D printing model data and a virtual object data.

In an embodiment of the invention, the input device includes a sensing device, and the sensing device is configured to sense an eyeball object to generate the input signal.

In an embodiment of the invention, the VR display device displays a confirm icon in the VR image in response to the input signal.

In an embodiment of the invention, the VR display device displays a read icon in the VR image in response to the input signal.

In an embodiment of the invention, the VR display device displays a print platform selection icon in the VR image in response to the input signal.

In an embodiment of the invention, the input device receives another input signal and the another input signal corresponds to a selection result of the print platform selection icon. The size of the 3D model is determined based on the selection result.

In an embodiment of the invention, the 3D printing apparatus further includes a display device. The display device is coupled to the processing device. The processing device displays an edit interface including the 3D model by the display device in response to executing the edit module.

In an embodiment of the invention, the processing device executes the edit module to edit another 3D model, and the processing device provides another generic model data corresponding to the another 3D model to the VR display device such that the VR display device displays another virtual object corresponding to the another 3D model.

The 3D printing method of the invention includes the following steps: displaying a VR image by a VR display device, and receiving an input signal by an input device, wherein the input signal corresponds to selecting a virtual object in the VR image; obtaining a generic model data corresponding to the virtual object based on the input data; executing an edit module to edit a 3D model corresponding to the virtual object based on the generic model data; and outputting a plurality of layered data corresponding to the 3D model to a 3D printing device, such that the 3D printing device prints a 3D object corresponding to the 3D model based on the plurality of layered data.

In an embodiment of the invention, the generic model data belongs to a generic format, or the generic model data includes a 3D printing model data and a virtual object data.

In an embodiment of the invention, the step of displaying the VR image, and receiving the input signal includes: sensing an eyeball object by a sensing device of the input device to generate the input signal.

In an embodiment of the invention, the step of displaying the VR image, and receiving the input signal includes: displaying a confirm icon in the VR image in response to the input signal.

In an embodiment of the invention, the step of displaying the VR image, and receiving the input signal includes: in response to the input signal, displaying a read icon in the VR image.

In an embodiment of the invention, the step of displaying the VR image, and receiving the input signal includes: in response to the input signal, displaying a print platform selection icon in the VR image.

In an embodiment of the invention, the step of displaying the VR image, and receiving the input signal further includes: receiving another input signal provided by the input device, wherein the another input signal corresponds to a selection result of the print platform selection icon, and the size of the 3D model is determined based on the selection result.

In an embodiment of the invention, the step of executing the edit module to edit the 3D model corresponding to the virtual object based on the generic model data includes: displaying an edit interface including the 3D model by the display device in response to executing the edit module.

In an embodiment of the invention, the 3D printing method further includes: executing the edit module to edit another 3D model; and providing another generic model data corresponding to the another 3D model to the VR display device, such that the VR display device displays another virtual object corresponding to the another 3D model.

Based on the above, the 3D printing apparatus and the 3D printing method of the invention can combine VR function to allow the user to select the virtual object to be printed in the VR image, edit the 3D model corresponding to the virtual object on the edit interface, and print a 3D object corresponding to the 3D model based on a plurality of layered data of the 3D model by a 3D printing device.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
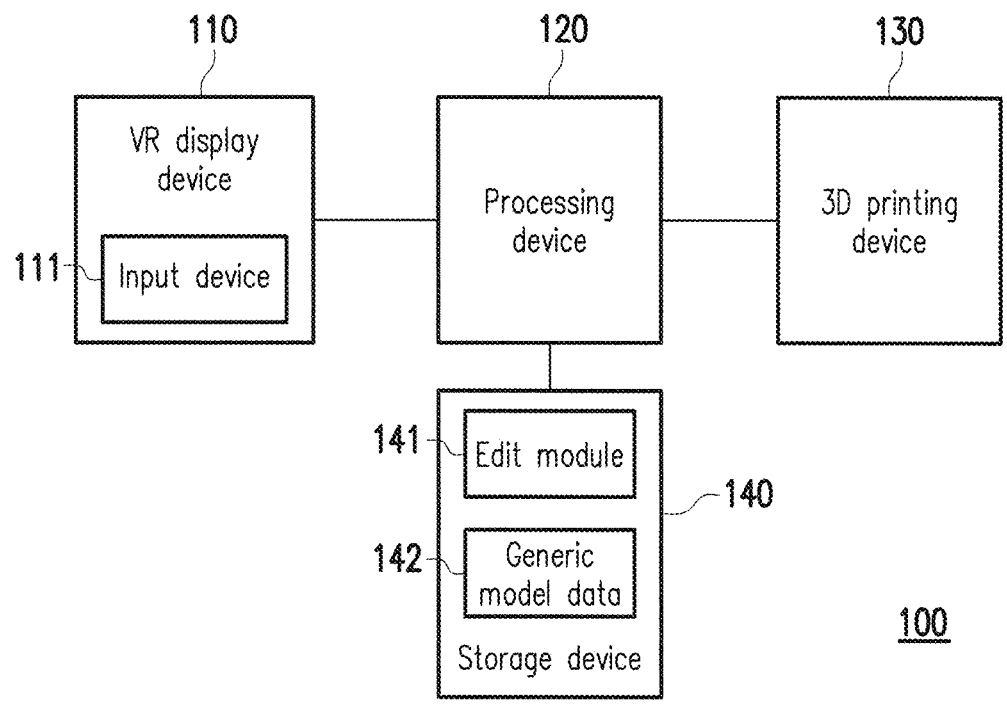
FIG. 1 shows a schematic of a 3D printing apparatus of an embodiment of the invention.

To make the content of the invention more easily understood, embodiments are provided below as examples of actual implementation of the invention. Moreover, whenever possible, devices/components/steps having the same reference numerals in the figures and embodiments represent the same or similar parts.

FIG. 1 shows a schematic of a three-dimensional (3D) printing apparatus of an embodiment of the invention. Please refer to FIG. 1. A 3D printing apparatus 100 includes a virtual reality (VR) device 110, a processing device 120, a 3D printing device 130, and a storage device 140. In the present embodiment, the VR display device 110 is configured to display a VR image. The VR display device 110 includes an input device 111. The input device 111 is configured to receive an input signal provided by the user. In the present embodiment, the storage device 140 is configured to store an edit module 141 and a communication model data 142. The 3D printing device 130 may perform a 3D printing operation based on a layered data provided by the processing device 120.

In the present embodiment, the VR display device 110 can be, for instance, a portable VR device and may include, for instance, an image processor, a head-mounted display, and an object posture sensor, and the invention is not limited thereto. For instance, in the present embodiment, the user may wear a head-mounted display of the VR display device 110, and the image processor may provide image data to the head-mounted display, such that the user may observe a VR image by the head-mounted display. Moreover, in the present embodiment, the VR display device 110 may further sense the user's movement by an object posture sensor and execute related operations in the VR image in response to the user's movement.

In the present embodiment, the processing device 120 may include a processing chip, an image processing chip, or, for instance, a central processing unit (CPU), or other programmable general-use or specific-use microprocessors, digital signal processors (DSP), programmable controllers, application-specific integrated circuits (ASIC), programmable logic devices (PLD), other similar processing circuits, or a combination of these devices.

In, the present embodiment, the 3D printing device 130 may include, for instance, a print head, a print platform, and a drive device. For instance, the print head is configured to mold a material by melting and feed the melted molded material on the print platform for a 3D printing operation. Moreover, the 3D printing device 130 can also include, for instance, other components (such as a controller, heating module, supply line, or interlocking mechanism of the print head) configured to complete the 3D printing operation with the print head, print platform, and drive device, and sufficient teaching, suggestion, and embodiment of related components thereof can be obtained based on techniques in the art and are not repeated herein.

In the present embodiment, the 3D printing operation refers to the 3D printing device 130 controlling the movement path of the print head based on a plurality of layered data of a 3D model and operating the print head to print a layered object on the bearing surface of the print platform. These layered data may be 2D image files. In the present embodiment, the 3D printing device 130 may print a plurality of layered objects in order, such that the layered objects are stacked on the bearing surface of the print platform into a 3D object. In the present embodiment, the processing device 120 may read 3D image files to show a 3D model in the edit interface. Moreover, the 3D model can be forming by, for instance, computer-aided design (CAD) or an animation modeling software.

In the present embodiment, the storage device 140 may be, for instance, a dynamic random access memory (DRAM), a flash memory, or a non-volatile random access memory (NVRAM). The storage device 140 is configured to store the module and data of each embodiment of the invention, such that the processing device 120 may read or execute the modules and data to achieve, for instance, the data operation or model editing operation of each embodiment of the invention. Moreover, the module of each embodiment of the invention can be implemented in, for instance, a software form or a hardware circuit form, and the invention is not limited in this regard.

Figure 2:
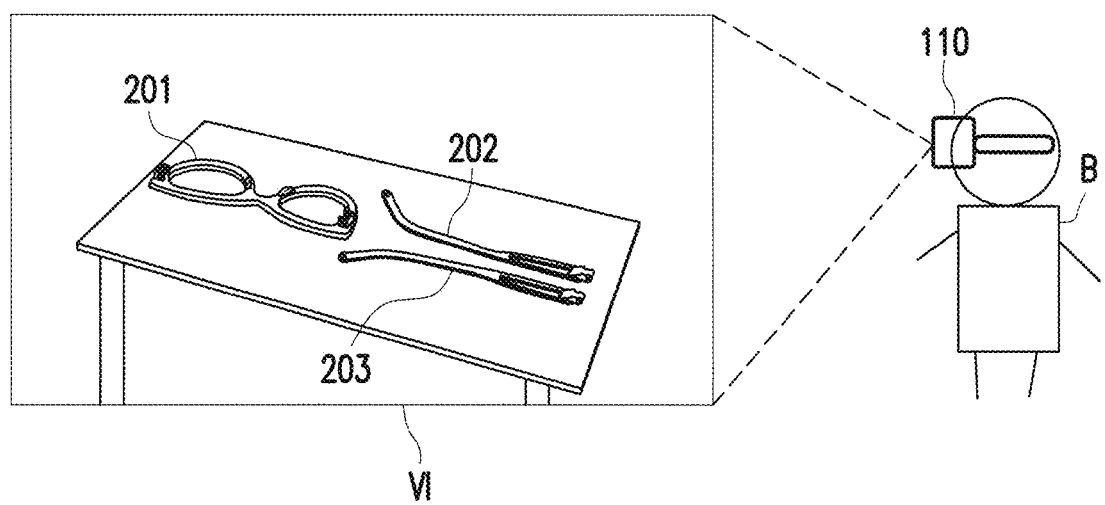
FIG. 2 shows a schematic of a virtual reality (VR) image of an embodiment of the invention.

FIG. 2 shows a schematic of a VR image of an embodiment of the invention. Please refer to FIG. 1 and FIG. 2. In the present embodiment, when the user wears the VR display device 110, a user B may observe a VR image VI shown in FIG. 2. Specifically, the VR image VI may display a 3D image screen and the 3D image screen may include a plurality of virtual objects 201, 202, and 203. In the present embodiment, the VR image VI can show, for instance, a 3D table object, and the table object may include a plurality of virtual objects 201, 202, and 203 thereon. In the present embodiment, the user B may achieve a related operation in the VR image VI by the input device 111.

For instance, the input device 111 can be, for instance, a mouse, keyboard, joystick, or the object posture sensor above, etc. The input device 111 may receive an input signal provided by the user and provide the input signal to the VR display device 110, such that the VR display device 110 may execute a corresponding related operation in the VR image VI based on the input signal, but the invention is not limited thereto. In an embodiment, the input device 111 may further include a sensing device. The sensing device is configured to sense an eyeball object of the user B to generate an input signal. That is to say, in an embodiment, the VR display device 110 may also sense the eyeball movement of the user by the sensing device to execute a corresponding related operation in the VR image VI.

In the present embodiment, the user B can provide an input signal to the processing device 120 by the input device 111 to execute the action of selecting the virtual object 201 in the VR image VI. In the present embodiment, the processing device 120 may correspondingly execute an edit module 141 and read a generic model data 142 by the selection result of the user to edit a 3D model corresponding to the virtual object 201. Moreover, the user may print the 3D model by the 3D printing device 130. That is to say, the 3D printing apparatus 100 of the present embodiment may combine the function of the VR display device 110, such that the user may print the selected virtual object 201 in the VR image VI directly by the 3D printing device 130.

Figure 3A:
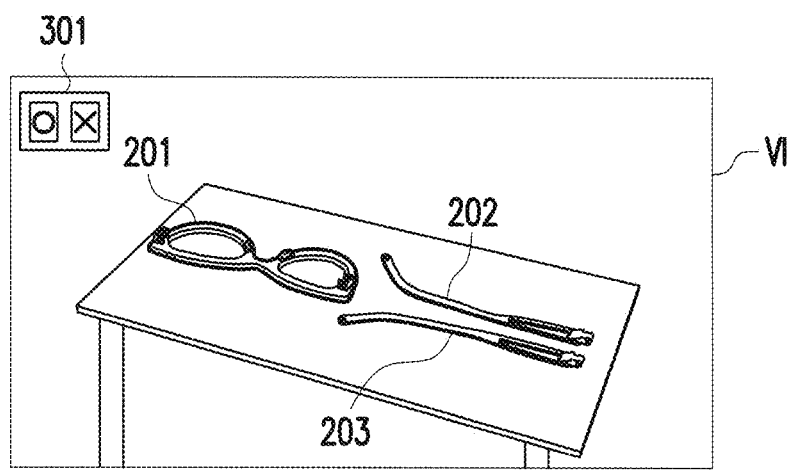
FIG. 3A shows a schematic of a confirm icon of a VR image of an embodiment of the invention.

FIG. 3A shows a schematic of a confirm icon of a VR image of an embodiment of the invention. Please refer to FIG. 1, FIG. 2, and FIG. 3A. In the present embodiment, when the user B inputs a selection signal by the input device 111 to execute the action of selecting the virtual object 201 in the VR image VI, the VR display device 110 can display a confirm icon 301 in the VR image VI in response to the input signal. For instance, the confirm icon 301 can include two icons such that the user B can select whether to confirm the selection result.

Figure 3B:
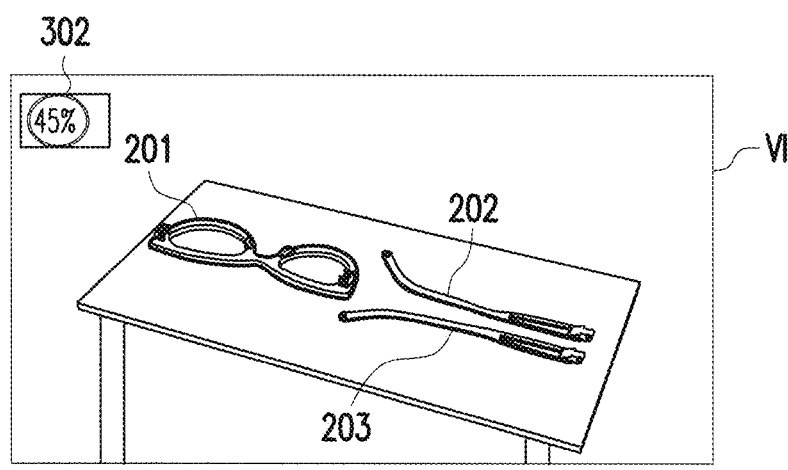
FIG. 3B shows a schematic of a read icon of a VR image of an embodiment of the invention.

FIG. 3B shows a schematic of a read icon of a VR image of an embodiment of the invention. Please refer to FIG. 1, FIG. 2, and FIG. 3B. In the present embodiment, when the user B inputs a selection signal by the input device 111 to execute the action of confirming the selection result in the VR image VI (as shown in FIG. 3A), the VR display device 110 may display a read icon 302 in the VR image VI in response to the input signal. For instance, the read icon 302 may display read progress. It should be mentioned that, during the reading stage, the processing device 120 may read the generic model data 142 corresponding to the virtual object 201 in the storage device 140 and provide the generic model data 142 to the edit module 141. In the present embodiment, the edit module 141 is, for instance, an operating procedure of the 3D printing device 130. The edit module 141 is configured to execute and edit a 3D model data and output a plurality of corresponding layered data to the 3D printing device 130 to drive the 3D printing device 130 to execute a print operation.

Specifically, in the present embodiment, the generic model data may include data of two file formats, and the data of two file formats are respectively a virtual object data and a 3D printing model data, where the virtual object data may be integrated with the 3D printing model data. That is to say, when the user B selects the virtual object 201 in the VR image VI by the input device 111, the processing device 120 may read the 3D printing model data corresponding to the virtual object 201 in the storage device 140 and set up the 3D printing model data in the edit module 141 to edit the 3D printing model data corresponding to the virtual object 201. However, in an embodiment, the generic model data may also be a single file format. That is to say, the generic model data may belong to a generic format data and may be provided to the VR display device 110 and the edit module 141 such that the VR display device 110 and the edit module 141 respectively execute the same file data to respectively display a virtual object in the VR image VI and execute the editing of the 3D model in the 3D printing device 130.

Figure 3C:
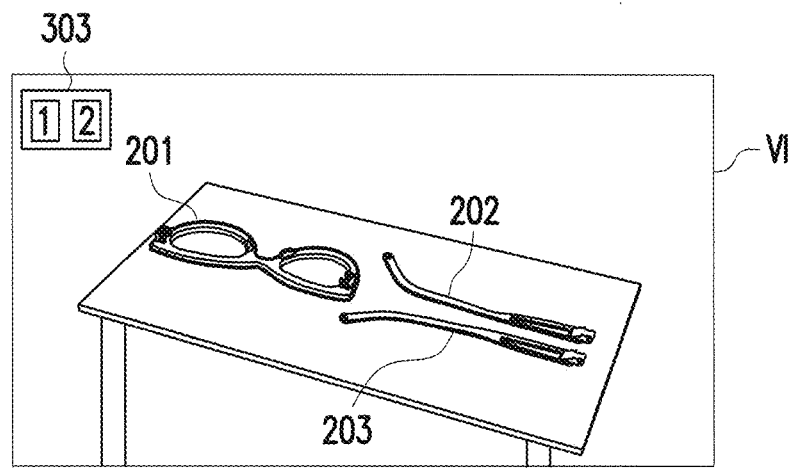
FIG. 3C shows a schematic of a print platform selection icon of a VR image of an embodiment of the invention.

FIG. 3C shows a schematic of a print platform selection icon of a VR image of an embodiment of the invention. Please refer to FIG. 1, FIG. 2, and FIG. 3. In the present embodiment, after the processing device 120 finishes reading the generic model data in the storage device 140 (as shown in FIG. 3B), the user B can input another input signal by the input device 111 such that the VR display device 110 displays a print platform selection icon 303 in the VR image VI in response to the input signal. For instance, the print platform selection icon 303 may include a plurality of icons to allow the user B to select the type of the print platform, wherein the type of the print platform may correspond to print platforms of different sizes. The size of the print platform may be, for instance, 200 mm×150 mm×120 mm or 180 mm×145 mm×110 mm, and the invention is not limited thereto. In the present embodiment, when the user B selects an icon in the print platform selection icon 303 to select the type of the print platform, the processing device 120 may execute the edit module 141 to edit the 3D model corresponding to the virtual object 201 based on the generic model data 142.

It should be mentioned that, in the present embodiment, the processing device 120 can correspondingly adjust the size of the 3D model based on the selection of the print platform. In the case that the size of the print platform is 200 mm×150 mm×120 mm, the processing device 120 may adjust the length of the 3D model in a specific direction to half the platform size. That is to say, in the present embodiment, the processing device 120 may adjust the size of the 3D model to 100 mm×20 mm×44 mm, but the invention is not limited thereto. Moreover, in an embodiment, the processing device 120 may also transform the coordinate of the space in which the virtual object 201 is located in the VR image VI to directly transform the virtual object into a 3D platform space in the edit interface.

Figure 4:
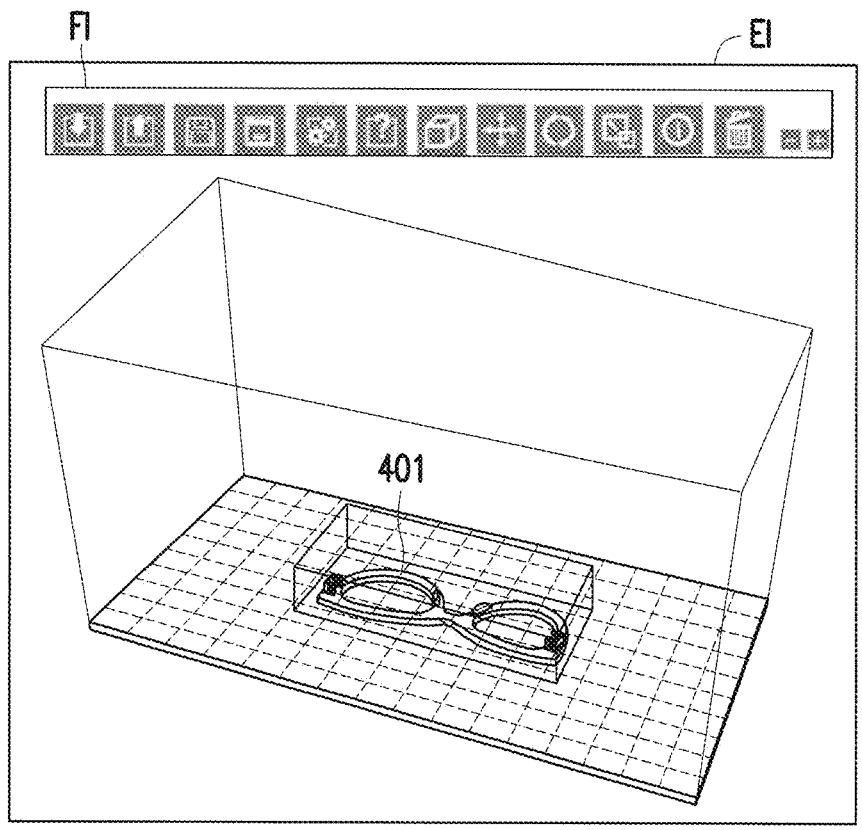
FIG. 4 shows a schematic of an edit module of an embodiment of the invention.

FIG. 4 shows a schematic of an edit module of an embodiment of the invention. Please refer to FIG. 1, FIG. 2, and FIG. 4. In the present embodiment, when the user B selects the type of the print platform, the processing device 120 may execute the edit module 141 to edit a 3D model 401 corresponding to the virtual object 201 based on the generic model data 142. It should be mentioned that, in the present embodiment, the processing device 120 may switch the display screen of the VR display device 110 to display an edit interface EI shown in FIG. 4. Alternatively, in an embodiment, the 3D printing apparatus 100 may also display the edit interface EI by another display device, and the invention is not limited thereto. In the present embodiment, the edit interface EI is suitable for showing the 3D platform space shown in FIG. 4 to allow the user to perform an editing operation on the 3D model 401 in the 3D platform space, and the edit interface EI may include a plurality of function icons FI to allow the user to select various editing functions.

In the present embodiment, the user B can edit the 3D model 401, and after editing is complete, the edit module 141 can execute a layering operation on the 3D model 401 to generate a plurality of layered data. Moreover, when the processing device 120 outputs the layered data corresponding to the 3D model 401 to the 3D printing device 130, the 3D printing device 130 may print the 3D object corresponding to the 3D model 401 based on the layered data. That is to say, the 3D printing apparatus 100 of the present embodiment can directly output the virtual object 201 selected by the user B in the VR image VI to the edit module 141 to edit the 3D model 401 corresponding to the virtual object 201. Moreover, the 3D printing apparatus 100 of the present embodiment can print the 3D model 401 by operating the 3D printed object 130.

However, the 3D printing apparatus of the invention is not limited to the embodiment in which the virtual object in the virtual display image is actually printed out as shown in FIG. 3A to FIG. 3C. In an embodiment, when the processing device 120 executes the edit module 141 to edit another 3D model, the processing device 120 may provide another generic model data corresponding to the another 3D model to the VR display device 110 such that the VR display device 110 displays another virtual object corresponding to the another 3D model. That is to say, the 3D printing apparatus 100 of the invention may also allow the user to simulate the environment of displaying the actual 3D object by the VR display device 110 when the user edits the 3D model, such that the user may more accurately perform an editing operation on the 3D model.

Figure 5:
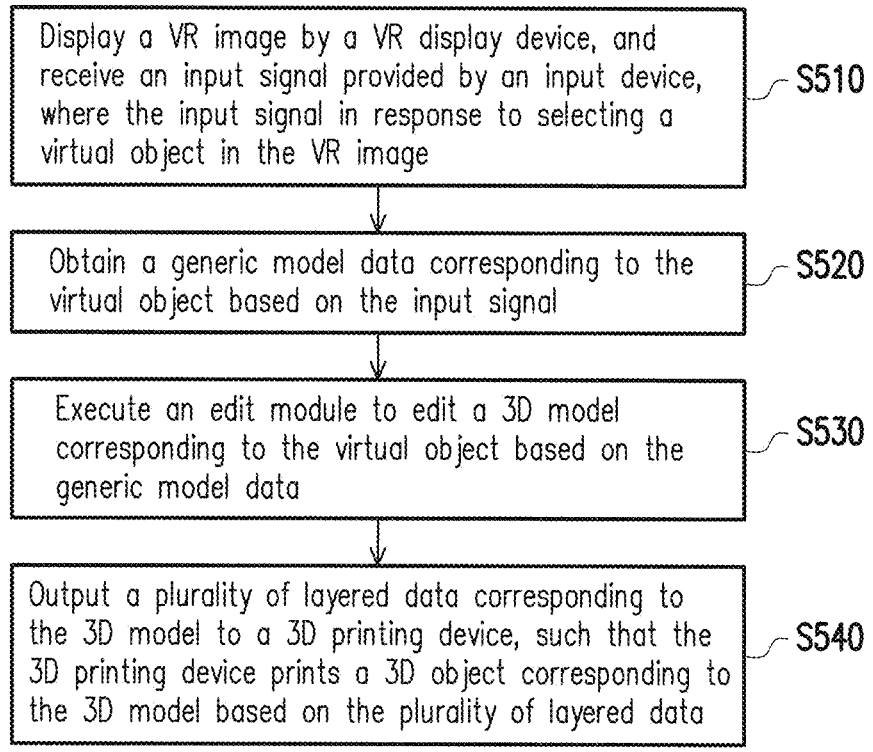
FIG. 5 shows a flowchart of a 3D printing method of an embodiment of the invention.

FIG. 5 shows a flowchart of a 3D printing method of an embodiment of the invention. Please refer to FIG. 1 and FIG. 5. The 3D printing method of the present embodiment may at least be suitable for the 3D printing apparatus 100 of FIG. 1. In step S510, the 3D printing apparatus 100 displays a VR image by the VR display device 110, and receives an input signal provided by the input device 111, wherein the input signal corresponds to selecting a virtual object in the VR image. In step S520, the 3D printing apparatus 100 obtains a generic model data corresponding to the virtual object based on the input signal in the storage device 140. In step S530, the 3D printing apparatus 100 executes the edit module 141 to edit a 3D model corresponding to the virtual object based on the generic model data 142. In step S540, the 3D printing apparatus 100 outputs a plurality of layered data corresponding to the 3D model to the 3D printing device 130, such that the 3D printing device 130 prints a 3D object corresponding to the 3D model based on the plurality of layered data. Therefore, the 3D printing method of the invention can combine VR function to provide the selected virtual object actually printed in the VR image to the user.

Moreover, sufficient teaching, suggestion, and description of related embodiment details and related device features of the 3D printing apparatus 100 of the present embodiment can be obtained in the embodiments of FIG. 1 to FIG. 4 and are not repeated herein.

Based on the above, the 3D printing apparatus and the 3D printing method of the invention can combine VR function to allow the user to actually print a virtual object in a VR image. Moreover, the 3D printing apparatus can also allow the user to simulate a 3D environment in which the 3D model is shown in actual size by the VR display device when editing a 3D model to allow the user to accurately control, for instance, the size of the 3D model or model details.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A three-dimensional printing apparatus, comprising:
a virtual reality display device, configured to display a virtual reality image, and the virtual reality display device comprising an input device, wherein the input device is configured to provide an input signal, and the input signal in response to selecting a virtual object in the virtual reality image;
a processing device, coupled to the virtual reality display device, and the processing device is configured to obtain a generic model data corresponding to the virtual object based on the input signal and execute an edit module to edit a three-dimensional model corresponding to the virtual object based on the generic model data; and
a three-dimensional printing device, coupled to the processing device, when the processing device outputs the plurality of layered data corresponding to the three-dimensional model to the three-dimensional printing device, the three-dimensional printing device is configured to print a three-dimensional object corresponding to the three-dimensional model based on a plurality of layered data,
wherein the virtual reality display device in response to the input signal to display a print platform selection icon in the virtual reality image,
wherein the input device is further configured to provide another input signal, and the another input signal in response to a selection result of the print platform selection icon for selecting a type of a print platform, wherein a size of the three-dimensional model is determined based on the selection result, so that the size of the three-dimensional model is adjusted accordingly to a size of a selected print platform.

2. The three-dimensional printing apparatus of claim 1, further comprising:
a storage device, coupled to the processing device, and the storage device is configured to store the generic model data, wherein the generic model data belongs to a generic format data, or the generic model data comprises a three-dimensional printing model data and a virtual object data.

3. The three-dimensional printing apparatus of claim 1, wherein the input device comprises a sensing device, and the sensing device is configured to sense an eyeball object to generate the input signal.

4. The three-dimensional printing apparatus of claim 1, wherein the virtual reality display device displays a confirm icon in the virtual reality image in response to the input signal.

5. The three-dimensional printing apparatus of claim 1, wherein the virtual reality display device displays a read icon in the virtual reality image in response to the input signal.

6. The three-dimensional printing apparatus of claim 1, further comprising:
a display device, coupled to the processing device, wherein the processing device in response to executing the edit module to display an edit interface comprising the three-dimensional model by the display device.

7. The three-dimensional printing apparatus of claim 1, wherein the processing device executes the edit module to edit another three-dimensional model, and the processing device provides another generic model data corresponding to the another three-dimensional model to the virtual reality display device, such that the virtual reality display device displays another virtual object corresponding to the another three-dimensional model.

8. A three-dimensional printing method, comprising:
displaying a virtual reality image by a virtual reality display device, and receiving an input signal provided by an input device, wherein the input signal in response to selecting a virtual object in the virtual reality image;
obtaining a generic model data corresponding to the virtual object based on the input signal;
executing an edit module to edit a three-dimensional model corresponding to the virtual object based on the generic model data; and
outputting a plurality of layered data corresponding to the three-dimensional model to a three-dimensional printing device, such that the three-dimensional printing device prints a three-dimensional object corresponding to the three-dimensional model based on the plurality of layered data,
wherein the step of displaying the virtual reality image, and receiving the input signal comprises:
in response to the input signal, displaying a print platform selection icon in the virtual reality image; and
receiving another input signal provided by the input device, wherein the another input signal in response to a selection result of the print platform selection icon, and a size of the three-dimensional model is determined based on the selection result, so that the size of the three-dimensional model is adjusted accordingly to a size of a selected print platform.

9. The three-dimensional printing method of claim 8, wherein the generic model data belongs to a generic format data, or the generic model data comprises a three-dimensional printing model data and a virtual object data.

10. The three-dimensional printing method of claim 8, wherein the step of displaying the virtual reality image, and receiving the input signal comprises:
sensing an eyeball object by a sensing device of the input device to generate the input signal.

11. The three-dimensional printing method of claim 8, wherein the step of displaying the virtual reality image, and receiving the input signal comprises:
displaying a confirm icon in the virtual reality image in response to the input signal.

12. The three-dimensional printing method of claim 8, wherein the step of displaying the virtual reality image, and receiving the input signal comprises:
displaying a read icon in the virtual reality image in response to the input signal.

13. The three-dimensional printing method of claim 8, wherein the step of executing the edit module to edit the three-dimensional model corresponding to the virtual object based on the generic model data comprises:
in response to executing the edit module, displaying an edit interface comprising the three-dimensional model by the display device.

14. The three-dimensional printing method of claim 8, further comprising:
executing the edit module to edit another three-dimensional model; and
providing another generic model data corresponding to the another three-dimensional model to the virtual reality display device such that the virtual reality display device displays another virtual object corresponding to the another three-dimensional model.

* * * * *